United States Patent
Zhao et al.

(10) Patent No.: US 10,505,580 B2
(45) Date of Patent: Dec. 10, 2019

(54) ANTENNA TUNING CONTROL USING GENERAL PURPOSE INPUT/OUTPUT DATA

(71) Applicants: STMicroelectronics (Shenzhen) R&D Co. Ltd, Shenzhen (CN); STMicroelectronics (Tours) SAS, Tours (FR)

(72) Inventors: Songfeng Zhao, Shenzhen (CN); Jean Pierre Proot, Saint Cyr sur Loire (FR)

(73) Assignees: STMicroelectronics (Shenzhen) R&D Co. Ltd, Shenzhen (CN); STMicroelectronics (Tours) SAS, Tours (FR)

( * ) Notice: Subject to any disclaimer, the term of this patent is extended or adjusted under 35 U.S.C. 154(b) by 0 days.

(21) Appl. No.: 16/270,394

(22) Filed: Feb. 7, 2019

(65) Prior Publication Data

US 2019/0268034 A1    Aug. 29, 2019

Related U.S. Application Data

(60) Provisional application No. 62/636,570, filed on Feb. 28, 2018.

(51) Int. Cl.
| | |
|---|---|
| *H04L 27/10* | (2006.01) |
| *H04B 1/44* | (2006.01) |
| *H01Q 3/00* | (2006.01) |
| *H04L 1/00* | (2006.01) |
| *H04L 29/06* | (2006.01) |
| *H04L 25/49* | (2006.01) |

(52) U.S. Cl.
CPC .............. *H04B 1/44* (2013.01); *H01Q 3/005* (2013.01); *H04L 1/0058* (2013.01); *H04L 25/4917* (2013.01); *H04L 69/18* (2013.01)

(58) Field of Classification Search
CPC ............ H04L 25/4917; H04L 25/4925; H04B 7/0602; H04B 7/0802; H04B 7/0404
USPC .............. 375/286; 343/876; 455/562.1, 575.7
See application file for complete search history.

(56) References Cited

U.S. PATENT DOCUMENTS

| | | | |
|---|---|---|---|
| 8,208,867 B2 * | 6/2012 | Lum ...................... | H04B 1/48 |
| | | | 455/78 |
| 9,172,440 B2 * | 10/2015 | Park ..................... | H04B 7/0404 |
| 2019/0138769 A1 * | 5/2019 | Martinez ............ | G06K 7/10356 |

OTHER PUBLICATIONS

Lattice Semiconductor, "MIPI D-PHY Interface IP," Reference Design RD1182, Ver. 1.5, Jan. 2015, 26 pages.

(Continued)

*Primary Examiner* — Khai Tran
(74) *Attorney, Agent, or Firm* — Seed IP Law Group LLP

(57) ABSTRACT

A digital-to-analog converter (DAC) and a method for operating the DAC are disclosed. The DAC receives, over a first channel, a control signal that is transmitted in accordance with a binary protocol. The DAC also receives, over a second channel different than the first channel, data that is transmitted in accordance with a multilevel communication protocol that is different than the binary protocol. The DAC determines a plurality of first and second voltages based on the received data and identifies, based on the control signal, a time when data transmission or reception is switched between first and second antennas. In response to identifying, based on the control signal, the time when data transmission or reception is switched, the DAC outputs the determined plurality of first voltages to a first antenna tuning circuit or the determined plurality of second voltages to a second antenna tuning circuit.

21 Claims, 4 Drawing Sheets

(56) References Cited

OTHER PUBLICATIONS

Skyworks, "SKY13698-694LF: 0.4 to 5.9 GHz DPDT Low Insertion Loss/High Isolation Switch," Product Summary, Apr. 2017, 2 pages.
ST, "Parascan™ tunable integrated capacitor," STPTIC-56G2, Datasheet—production data, Rev. 1, Jul. 2015, 11 pages.
ST, "Antenna tuning circuit with turbo and glide," STHVDAC-253MTG, Datasheet—production data, Rev. 4, Nov. 2015, 28 pages.
ST, "RFFE HVDAC control," AN4440 Application note, Rev. 1, Apr. 2014, 36 pages.

* cited by examiner

FIG. 3

| Reg # | Reg address hex | Reg address bin | D7 MSB | D6 | D5 | D4 | D3 | D2 | D1 | D0 LSB | Access type |
|---|---|---|---|---|---|---|---|---|---|---|---|
| 0 | 00h | [00000] | | | | | | | | | RW |
| 1 | 01h | [00001] | | | | | | | | | RW |
| 2 | 02h | [00010] | TM_A | | | | DAC_A | | | | RW |
| 3 | 03h | [00011] | TM_B | | | | DAC_B | | | | RW |
| 4 | 04h | [00100] | TM_C | | | | DAC_C | | | | RW |
| 5 | 05h | [00101] | | | | | | | | | RW |
| 6 | 06h | [00110] | TM_D | | | | DAC_D | | | | RW |
| 7 | 07h | [00111] | TM_E | | | | DAC_E | | | | RW |
| 8 | 08h | [01000] | TM_F | | | | DAC_F | | | | RW |

ANTENNA TUNING CONTROL USING GENERAL PURPOSE INPUT/OUTPUT DATA

BACKGROUND

Technical Field

This disclosure is directed to a digital-to-analog converter that receives a general purpose input/output (GPIO) signal and uses the received GPIO signal to provide an output voltage for driving an antenna and, in particular, a digital-to-analog converter that receives the GPIO signal in addition to a higher level multi-level modulated protocol data that sets the output voltage level.

Description of the Related Art

Digital-to-analog converters are ubiquitous in modern electronic devices. In principle, a digital-to-analog converter receives digital data and outputs an analog voltage in accordance with the received digital data. Modern electronic devices, such as handheld devices including smart phones and tablets, utilize sophisticated communication protocols to provide an interface between their components. Examples of such protocols include the Mobile Industry Processor Interface (MIPI) protocol, which is a high level complex communication protocol used for communication between components, such as a camera and its respective controller or a modem and its respective controller.

However, modification of MIPI protocol signaling in electronic devices is often restricted. For example, access to a controller's firmware may be limited such that MIPI protocol signaling reconfiguration may not be possible. This negatively impacts the interoperability between electronic device components. Accordingly, it is desirable to circumvent communication protocol restrictions and improve the interoperability of device components.

BRIEF SUMMARY

Provided herein is a method and a digital-to-analog converter that utilizes a first protocol that is a lower level signaling protocol, such as binary protocol signaling or general purpose input/output (GPIO) protocol signaling, to supplement second protocol that is a high level signaling protocol. In electronic devices, such as smart phones and tablets, various components interoperate and communicate with one another and advanced communications protocols have been developed and used for communication between the components. However, due to the existence of proprietary platforms, reconfiguration of the components is sometimes closed off. That leads to an inability on the part of component manufacturers to modify signaling information received by respective components. For example, a controller may be closed off by the manufacturer such that a user or a third party cannot edit or change the operation of the controller. The controller may not be reconfigured to change a time (by advancing or delaying) when switching information is signaled to a digital-to-analog converter.

Provided herein is a method and a digital-to-analog converter that receives a first protocol signal and uses the first protocol signal to supplement untimely or inadequate information received by through a second protocol signal. The digital-to-analog converter then provides an output voltage that is based on timing information gleaned from the first protocol signal rather than the information received by through the second protocol signal that is a higher level protocol signal. The first protocol may be a binary protocol, such as a general purpose input/output (GPIO) protocol, whereas the second protocol may be an advanced communication protocol. The second protocol may employ multi-level signaling beyond binary signaling. As compared with the first protocol, the second protocol may utilize complex signaling, encoding or modulation.

BRIEF DESCRIPTION OF THE SEVERAL VIEWS OF THE DRAWINGS

FIG. 3 shows a register array of the DAC of FIG. 1 in accordance with an embodiment.

DETAILED DESCRIPTION

In communication devices, such as cellphones and tablets, an antenna system is used for transmitting and receiving data. Many devices employ multiple antennas to achieve antenna diversity, where multiple antennas are used to transmit and receive data. Transmitting or receiving data is alternated or switched between the multiple antennas, which improves the communication speed of the devices.

Figure 1:
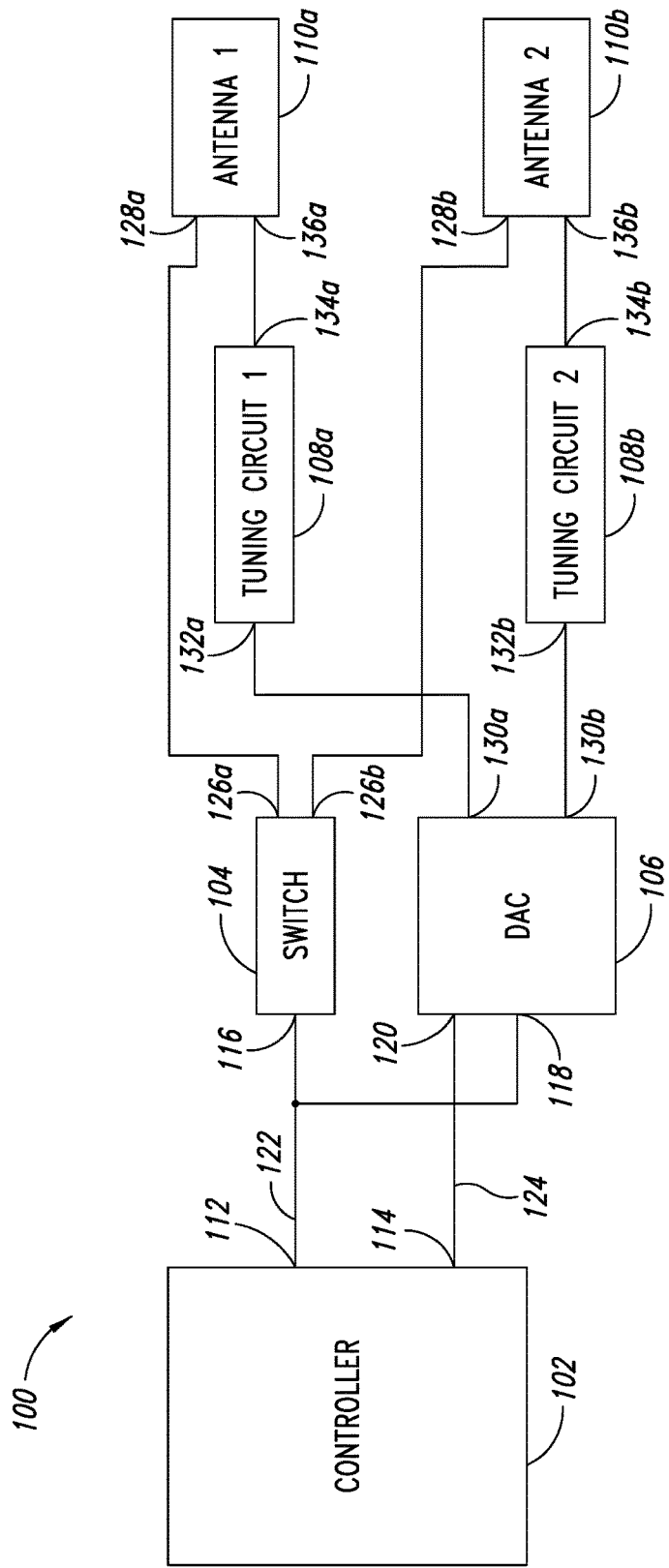
FIG. 1 shows a block diagram of a multi-antenna system including a digital-to-analog converter (DAC).

FIG. 1 shows a block diagram of a multi-antenna system 100 including a digital-to-analog converter (DAC). The system 100 includes a controller 102, a switch 104, a DAC 106, a first tuning circuit 108a, a second tuning circuit 108b, a first antenna 110a and a second antenna 110b. The system 100 drives the first antenna 110a and second antenna 110b and operates the antennas 110a, 110b for transmitting or receiving data.

The controller 102 may be any type of device that is configured to control the antennas 110a, 110b to transmit or receive data, turn on or off the first or second antennas 110a, 110b, switch transmit or receive operations between the first and second antennas 110a, 110b or employ transmit or receive diversity using the first and second antennas 110a, 110b. Further, the controller 102 may control the switch 104 and DAC 106. The controller 102 may control the DAC 106 to provide an analog voltage level to the first and second tuning circuits 108a, 108b. The controller 102 may also control the switch 104 to switch between using the first antenna 110a and the second antenna 110b.

For example, the controller 102 may be a modem, a microcontroller or a microprocessor, among others. The controller 102 and the DAC 106 may respectively include or be coupled to memory (not shown in FIG. 1). The memory, which may be a static or dynamic memory, may store executable instructions, that when executed by the controller 102 or the DAC 106 cause, controller 102 and the DAC 106 to operate as described herein.

The DAC 106 may be any type device that is configured to provide one or more output voltages based on input data. The DAC 106 may provide an analog output voltage in accordance with the input data. The DAC 106 may be a high-voltage device. For example, the DAC 106 may be configured to provide an output voltage that is greater than 20 Volts (V). The switch 104 may be any type of switch, such as a double-pole double-throw (DPDT) switch, that is configured to select between the first or second antennas 110a, 110b for transmitting and/or receiving data. Further, the switch 104 may be configured to employ antenna diversity using both the first and second antennas 110a, 110b. The tuning circuits 108a, 108b may each include one or more capacitances for providing a charge to the antennas 110a, 110b, respectively.

The controller 102 has a first output 112 and a second output 114. The switch 104 has an input 116. The first output 112 of the controller 102 is coupled to the input 116 of the switch 104. The DAC 116 has a first input 118 and a second input 120. The second output 114 of the controller 102 is coupled to the second input 120 of the DAC 106.

Communication between the controller 102 and the switch 104 takes place over a first communication channel 122 and using a first communication protocol. Communication between the controller 102 and the DAC 106 takes place over a second communication channel 124 and using a second communication protocol.

The first communication protocol may be a binary protocol, such as a general purpose input/output (GPIO) protocol. For example, the controller 102 may output a control signal that is a binary signal over the first output 112 to the switch 104. The control signal may have one of two states, whereby a first state may be a logical zero (or a deactivated or deasserted state) and a second state may be a logical one (or an activated or asserted state). The controller 102 may command the switch 104 to select between the first and second antennas 110a, 110b for data transmission or reception. For example, a logical zero may command the switch to use the first antenna 110a for data transmission or reception and a logical one may command the switch to use the second antenna 110b for data transmission or reception.

Conversely, the second communication protocol (used over the second communication channel 124) may be an advanced communication protocol. The second communication protocol may employ multilevel signaling beyond binary signaling. As compared with the binary first communication protocol, the second communication protocol may utilize complex signaling, encoding or modulation. For example, the second communication protocol may be a Mobile Industry Processor Interface (MIPI) protocol that can communicate over 5 megabits per second (Mbps).

The controller 102 outputs data over the second communication channel 124 indicating the output voltage of the DAC 106. Further, the controller 102 outputs data over the second communication channel 124 indicating when the switch 104 transitions between states.

The switch 104 has a first output 126a and a second output 126b. The first antenna 110a has a first input 128a and a second input 136a. The second antenna 110b has a first input 128b and a second input 136. The first and second outputs 126a, 126b of the switch 104 are coupled to the first input 128a of the first antenna 110a and the first input 128b of the second antenna 110b, respectively. The switch 104 uses the outputs 126a, 126b to select between the antennas 128a, 128b.

The DAC 106 has a first output 130a and a second output 130b. The first tuning circuit 108a has an input 132a and the second tuning circuit 108b has an input 132b. The first output 130a of the DAC 106 is coupled to the input 132a of the first tuning circuit 108a. The second output 130b of the DAC 106 is coupled to the input 132b of the second tuning circuit 108b.

The DAC 106 outputs respective output voltages over the first and second outputs 130a, 130b in accordance with the data received from the controller 102 over the second communication channel 124. The data may indicate one or more output voltages of the DAC 106. The tuning circuits 132a, 132b respectively receive the output voltages. The respective output voltages are used to charge the capacitances of the tuning circuits 132a, 132b.

The first and second tuning circuits 108a, 108b have respective outputs 134a, 134b. The outputs 134a, 134b are respectively coupled to the second inputs 136a, 136b of the first and second antennas 110a, 110b. The first and second tuning circuits 108a, 108b respectively provide a charge at their outputs 134a, 134b to the first and second antennas 110a, 110b to tune the first and second antennas 110a, 110b, respectively.

It is desirable for the DAC 106 to contemporaneously know when the switch 104 is operated. The controller 102 outputs two different indications of when the switch is operated. The controller 102 uses the first communication channel 122 to command (using a GPIO control signal) the switch 104 to select between the first and second antennas 110a, 110b. Thus, by the control signal, the first communication channel 122 indicates when the switch 104 is operated or switched between states. The control signal of the first communication channel 122 is the most contemporaneous representation of when the switch 104 is operated. That is because the control signal itself commands the switch 104.

In addition, the controller 102 outputs data over the second communication channel 124 indicating when the switch 104 is operated or when a switching operation between the first and second antennas 110a, 110b is performed. The controller 102 may output the data over the second communication channel 124 for use by the DAC 106. However, the data may not be provided by the controller 102 over the second communication channel 124 in a timely fashion. Furthermore, the controller 102 may be part of a proprietary platform, whereby access to the controller's 102 source code or firmware may be restricted such that the controller 102 may not be reconfigured to timely provide data indicating switching time of the antennas 110a, 110b using the second communication channel 124.

Therefore, while the DAC 106 is expected to rely on the data communicated over the second communication channel 124 to identify a time when the switch 104 is operated, the first communication channel 122 is tapped and provided to the DAC 106. Thus, the DAC 106 directly receives the control signal of the first communication channel 122. The control signal transmitted over the first communication channel 122 is a contemporaneous indication of when the switch 104 is operated. The DAC 106 can utilize the control signal to determine when the switch is operated. The DAC 106 may be configured to process the binary or GPIO of the control signal. Because the DAC 106 relies on the switching time indicated by the control signal, the DAC 106 may ignore or discard the indication of the timing received over the second communication channel 124. Relying on the control signal to identify when the switch 104 is operated improves the responsiveness of the DAC 106.

Whereas the first communication channel 122 may be a GPIO channel, the second communication channel 124 may be a multilevel protocol channel, such as a MIPI. The protocol of the second communication channel 124 may be more advanced or complex than that of the first communication channel 122 in terms of modulation, encoding or frequency, among others. For example, the protocol of the second communication channel 124 may be multilevel modulated, whereas the protocol of the first communication channel 122 may be a binary protocol. Further, the protocol of the second communication channel may 124 be encoded, for example, using error-detection or error-correction coding. The protocol of the first communication channel 122 may not utilize error-detection or error-correction coding. In addition, the frequency of transmission of the second communication channel 124 may be higher than that of the first communication channel 122. Due to the complexity of the second communication channel 124 as compared to the first communication channel 122, processing data of the first communication channel 122 may be simpler and may not require as much computational resources as processing data of the second communication channel 124.

Accordingly, in the system 100 of FIG. 1, the first communication channel 122 is tapped and the first output 112 of the controller 102 is coupled to the first input 118 of the DAC 106. As described herein, the first communication channel 122 is used by the controller 102 to command the switch 104 to select between the first and second antennas 110a, 110b. The DAC 106 is configured to receive the control signal transmitted over the first communication channel 122, which may be a GPIO control signal. The control signal of the first communication channel 122 indicates a time when the switch 104 is switched between states. The controller 102 may evaluate the received control signal and output, based on the control signal, voltages over its first and second outputs 130a, 130b. Timing of switching indicated by the control signal of the first communication channel 122 may be used, by the controller 102, to determine when to output the voltages to the first and second tuning circuits 108a, 108b.

Figure 2:
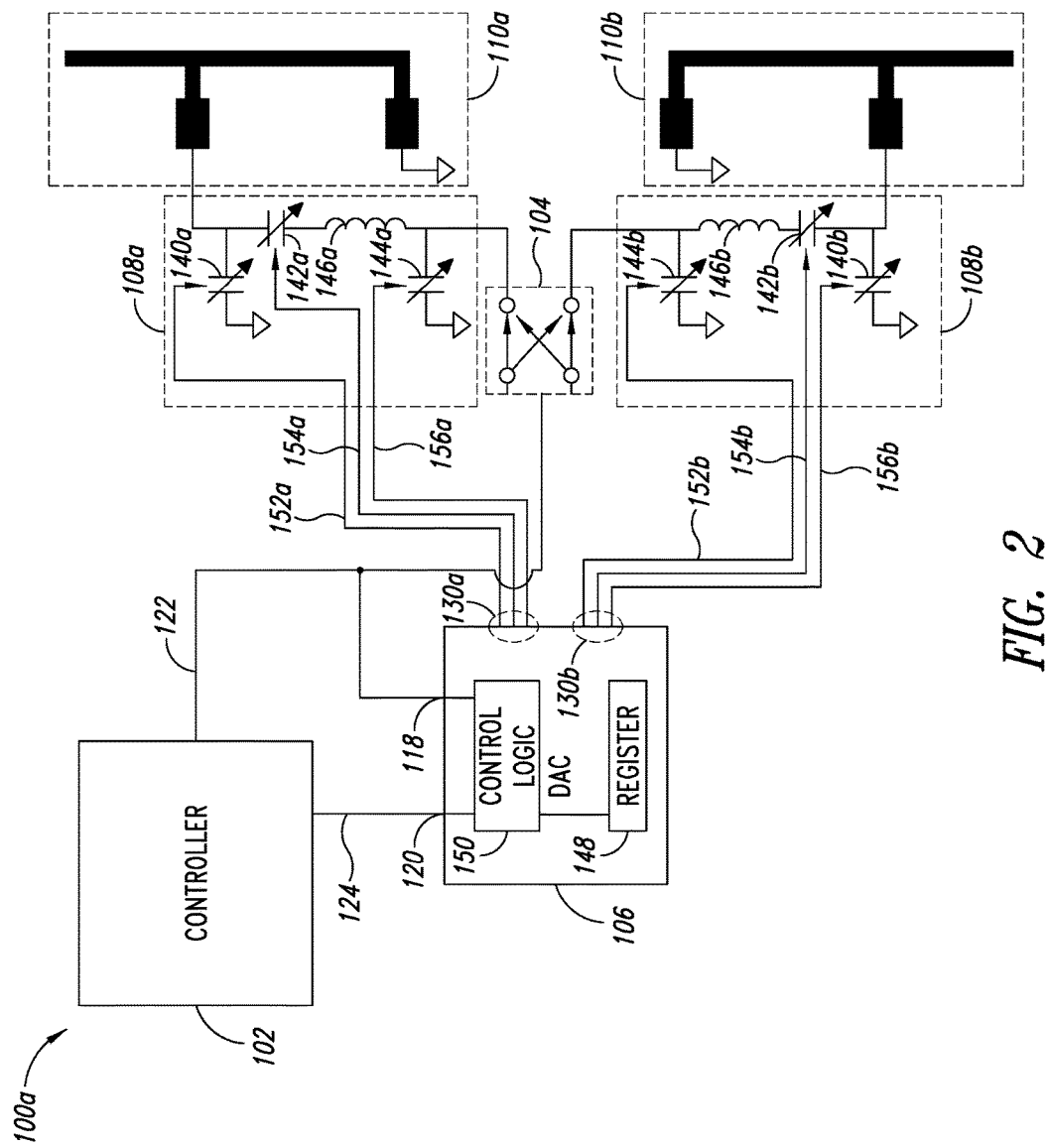
FIG. 2 shows a diagram of the multi-antenna system in accordance with an embodiment.

FIG. 2 shows a diagram of the multi-antenna system 100a in accordance with an embodiment. Similar elements of the multi-antenna system 100a as those of the multi-antenna system 100 described with reference to FIG. 1 have the same reference numerals. The first tuning circuit 108a includes first, second and third capacitances 140a, 142a, 144a and an inductance 146a. Similarly, the second tuning circuit 108b includes first, second and third capacitances 140b, 142b, 144b and an inductance 146b.

The DAC 106 includes a register array 148 and control logic 150. The register array 148 may be any type of memory that is configured to store data. The register array 148 may include a plurality of registers. In some embodiments of the register array 148 may be a cache, a read-only memory or a random access memory, among others. The control logic 150 may be a controller, a processor or hardware circuitry, among others. The register array 148 and the control logic 150 are communicatively coupled. The control logic 150 is also coupled to the first and second inputs 118, 120 of the DAC 106 and is configured to receive data from the controller 102 over the first and second inputs 118, 120. The control logic 150 may receive data over the first and second inputs 118, 120 and operate the DAC 106 and configure the register array 148 in accordance with the data.

The first output 130a of the DAC 106 is shown to include three output voltage lines to the first tuning circuit 108a including a first, second and third output voltage line 152a, 154a, 156a. Similarly, the second output 130b is shown to include three output voltage lines to the second tuning circuit 108b including a first, second and third output voltage line 152b, 154b, 156b. Each output voltage line 152a, 154a, 156a, 152b, 154b, 156b is used to charge the capacitors 140a, 142a, 144a, 140b, 142b, 144b, respectively, of the first and second tuning circuits 108a, 108b.

The control logic 150 receives over the second communication channel 124 data indicating an output voltage level for each output voltage line 152a, 154a, 156a, 152b, 154b, 156b. The control logic 150 processes the data and stores the data in the register array 148 as described herein. The control logic 150 then uses the data stored in the register array 148 to cause the DAC 106 to generate the output voltage levels of the respective output voltage lines 152a, 154a, 156a, 152b, 154b, 156b. The switch 104 may be coupled to the antennas 110a, 110b and may drive the antennas 110a, 110b.

FIG. 3 shows the register array 148 of the DAC in accordance with an embodiment. The register array 148 includes a plurality of registers 160. Each register of the plurality of registers 160 is associated with a register number 162 and has a unique address 164. Each register of the plurality of registers 160 includes a plurality of bits 166 (that are shown to include eight bits starting from a least significant bit (LSB) denoted as 'D0' to a most significant bit (MSB) denoted as 'D7') and is associated with a read/write access type 168 that dictates whether read or write access privileges to the register are available.

The plurality of registers 160 include the first set of registers that includes a first, a second and a third register 170a, 170b, 170c and the second set of registers that includes a first, a second and a third register 172a, 172b, 172c. The registers 170a, 170b, 170c, 172a, 172b, 172c store the output voltage levels of the output voltage lines 152a, 154a, 156a, 152b, 154b, 156b, respectively. In particular, seven bits are used to store the output voltage level of each line, thereby allowing for $2^7=128$ different voltage levels. By way of example, if the DAC 106 has a maximum output voltage level of 24V, then the DAC may output voltages of 0.19V increments starting from 0V to 24V.

If the control signal provided over the first communication channel 122 has a first state (for example, a logical zero or one), the control logic 150 may utilize the voltage levels stored in registers 170a, 170b, 170c to dictate the output voltage levels of the output voltage lines 152a, 154a, 156a. The voltage levels stored in the other set of registers (registers 172a, 172b, 172c) dictate the output voltage levels of the output voltage lines 152b, 154b, 156b.

Conversely, if the control signal provided over the first communication channel 122 has a second state (for example, a complement of the logical zero or one of the first state), the control logic 150 may utilize the voltage levels stored in registers 172a, 172b, 172c to dictate the output voltage levels of the output voltage lines 152a, 154a, 156a. The voltage levels stored in the other set of registers (registers 170a, 170b, 170c) dictate the output voltage levels of the output voltage lines 152b, 154b, 156b.

The state of the control signal provided over the first communication channel 122 is used by the control logic 150 to identify a register location from which to retrieve an indication of an output voltage level. The output voltage is provided over an output voltage line 152a, 154a, 156a, 152b, 154b, 156b to a capacitance of the first or second tuning circuits 108a, 108b.

Figure 4:
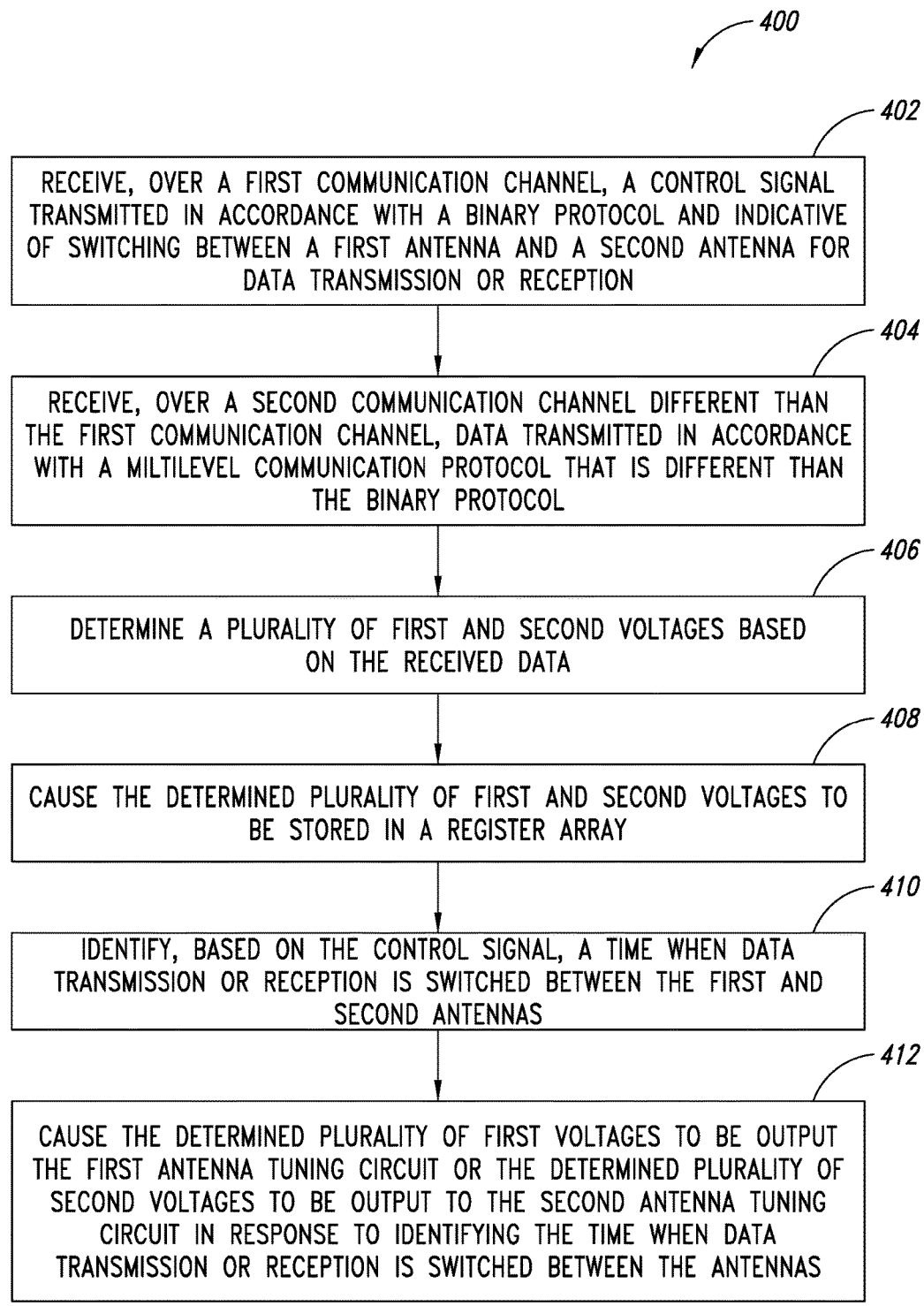
FIG. 4 shows a flow diagram of a method performed by control logic of the DAC.

FIG. 4 shows a flow diagram of a method 400 performed by control logic of the digital-to-analog converter 106. Examples of the control logic include the control logic 150 described with reference to FIG. 2. The control logic may be hardware circuitry or a controller, processor or microcontroller, among others. In the method 400, the control logic, at 402, receives, over a first communication channel, a control signal transmitted in accordance with a binary protocol and indicative of switching between a first antenna and a second antenna for data transmission or reception. For example, the first communication channel may be a GPIO channel. The control logic, at 404, receives, over a second communication channel different than the first communication channel, data transmitted in accordance with a multilevel communication protocol that is different than the binary protocol. The second communication channel may be a MIPI channel.

The control logic determines a plurality of first and second voltages based on the received data at 406. The plurality of first and second voltages may be signaled in the data. The control logic, at 408, causes the determined plurality of first and second voltages to be stored in a register array. For example, each voltage level may be stored in the respective register of the register array. The control logic, at 410, identifies, based on the control signal, a time when data transmission or reception is switched between the first and second antennas. The control logic, at 410, causes the determined plurality of first voltages to be output the first antenna tuning circuit or the determined plurality of second voltages to be output to the second antenna tuning circuit in response to identifying the time when data transmission or reception is switched between the antennas.

It is noted that in various embodiments, data transmitted using a lower complexity protocol, such as GPIO data, may be used instead of data transmitted using a higher complexity protocol, such as MIPI data, to identify relevant information. For example, determining whether a universal serial bus (USB) device is plugged into a USB port may be performed by inspecting a data line of the bus. If the data line is powered or if the data is exchanged over the data line, the USB device may be determined to be plugged in to the USB port. Conversely, if the lines are not powered or if no data is exchanged over the data line, the USB device may be determined to be unplugged from the USB port.

In an embodiment, detection of whether a USB cable is plugged triggers switching a transmission or reception frequency of the first or second antennas 110a, 110b. For example, the multi-antenna system 100 may be part of a smartphone. When a USB cable is connected or plugged into the smartphone, the operating frequency of the bottom antenna of the smartphone is reduced by 100 megahertz (MHz).

Making reference to FIG. 1, the first communication channel 122 may carry a USB detection signal that is a binary signal (for example, in accordance with a GPIO protocol). The USB detection signal may be asserted or activated when the USB cable is connected to the smartphone and deasserted or deactivated when the USB cable is connected to the smartphone. The signal convention may also be reversed in alternative embodiments.

The DAC 106 receives the USB detection signal and identifies based on the USB detection signal whether the USB cable is connected or not connected to the smartphone. As described with reference to FIG. 3, the DAC 106 has a register array 148 that includes a first set of registers 170a, 170b, 170c and a second set of registers 172a, 172b, 172c. The first set of registers 170a, 170b, 170c may store the output voltage levels of the DAC 106 when the USB cable is connected and the second set of registers 172a, 172b, 172c may store the output voltage levels of the DAC 106 when the USB cable is not connected. The DAC 106 receives the USB detection signal and switches between outputting the voltage levels stores in the first set or second set of registers based on the USB detection signal. When the USB detection signal indicates that the USB cable is connected, the DAC 106 outputs voltage levels stored in the first set of registers 170a, 170b, 170c. When the USB detection signal indicates that the USB cable is not connected, the DAC 106 outputs voltage levels stored in the second set of registers 172a, 172b, 172c. Thus, antenna configuration and operation is automatically adjusted depending on whether the USB cable is connected.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a first antenna configured to transmit or receive data;
a second antenna configured to transmit or receive data;
a first antenna tuning circuit configured to receive a plurality of first voltages for charging the first antenna;
a second antenna tuning circuit configured to receive a plurality of second voltages for charging the second antenna; and
a digital-to-analog converter configured to:
receive a control signal over a first communication channel, the control signal being transmitted in accordance with a binary protocol and the control signal indicating switching between the first and second antennas for data transmission or reception; and
receive data over a second communication channel different than the first communication channel, the data received being transmitted in accordance with a multilevel communication protocol that is different than the binary protocol;
determine the plurality of first and second voltages based on the received data;
identify a change in state, based on the control signal, that indicates data transmission or reception is switched between the first and second antennas; and
in response to the data transmission or reception switch, output the determined plurality of first voltages to the first antenna tuning circuit or the determined plurality of second voltages to the second antenna tuning circuit.

2. The system of claim 1, wherein the binary protocol is a general purpose input/output (GPIO) protocol and the multilevel communication protocol is a Mobile Industry Processor Interface (MIPI) protocol.

3. The system of claim 1, wherein the received data includes an indication of when data transmission or reception is switched between the first and second antennas, and wherein the digital-to-analog converter is configured to discard the indication and utilize the control signal to identify that data transmission or reception is switched between the first and second antennas.

4. The system of claim 1, wherein when the control signal is in a first state, data transmission or reception is performed by the first antenna and when the control signal is in a second state, data transmission or reception is performed by the first antenna.

5. The system of claim 1, wherein the multilevel communication protocol has a plurality of modulation levels and includes error-detection or error-correction encoding, and the binary protocol has two states and does not include the error-detection or error-correction encoding.

6. The system of claim 1, comprising:
a switch configured to receive the control signal and select, based on the control signal, one of the first antenna and the second antenna for data transmission or reception
a controller configured to:
output the control signal to the switch over the first communication channel; and
output the data to the digital-to-analog converter over the second communication channel.

7. The system of claim 6, wherein the first communication channel between the controller and the switch is tapped to provide the first communication channel to digital-to-analog converter.

8. The system of claim 7, wherein a firmware of the controller is access-protected to prevent reconfiguration of a time when the controller indicates, using the second communication channel, switching between the first and second antennas for data transmission or reception.

9. A method, comprising:
receiving a control signal over a first communication channel, the control signal being transmitted in accordance with a first protocol that is a binary protocol and the control signal indicating switching between a first antenna and a second antenna for data transmission or reception; and
receiving data over a second communication channel different than the first communication channel, the data received being transmitted in accordance with a second communication protocol that is different than the first protocol;
determining a plurality of first and second voltages based on the received data;
identifying, based on the control signal, a time when data transmission or reception is switched between first and second antennas; and
in response to identifying, based on the control signal, the time when data transmission or reception is switched between the first and second antennas, outputting the determined plurality of first voltages to a first antenna tuning circuit or the determined plurality of second voltages to a second antenna tuning circuit.

10. The method of claim 9, wherein the first protocol is a general purpose input/output (GPIO) protocol and the second communication protocol is a Mobile Industry Processor Interface (MIPI) protocol.

11. The method of claim 9, wherein the received data includes an indication of when data transmission or reception is switched between the first and second antennas.

12. The method of claim 11, comprising:
discarding the indication of when the data transmission or reception is switched between the first and second antennas; and
utilizing the control signal to identify the time when the data transmission or reception is switched between the first and second antennas.

13. The method of claim 9, wherein when the control signal is in a first state, data transmission or reception is performed by the first antenna and when the control signal is in a second state, data transmission or reception is performed by the first antenna.

14. The method of claim 9, wherein the second communication protocol has a plurality of modulation levels and includes error-detection or error-correction encoding, and the first protocol has two states and does not include the error-detection or error-correction encoding.

15. The method of claim 9, comprising:
tapping the first communication channel between a controller and a switch is tapped to provide the first communication channel to a digital-to-analog converter.

16. The method of claim 15, wherein a firmware of the controller is access-protected to prevent reconfiguration of a time when the controller indicates, using the second communication channel, switching between the first and second antennas for data transmission or reception.

17. A digital-to-analog converter, comprising:
a register array; and
control logic configured to:
receive a control signal over a first communication channel, the control signal being transmitted in accordance with a binary protocol and the control signal indicating switching between a first antenna and a second antenna for data transmission or reception; and
receive data over a second communication channel different than the first communication channel, the data received being transmitted in accordance with a multilevel communication protocol that is different than the binary protocol;
determine a plurality of first and second voltages based on the received data;
cause the determined plurality of first and second voltages to be stored in the register array;
identify, based on the control signal, a time when data transmission or reception is switched between the first and second antennas; and
in response to identifying, based on the control signal, the time when data transmission or reception is switched between the first and second antennas, cause the determined plurality of first voltages to be output to a first antenna tuning circuit or the determined plurality of second voltages to be output to a second antenna tuning circuit.

18. The digital-to-analog converter of claim 17, wherein the binary protocol is a general purpose input/output (GPIO) protocol and the multilevel communication protocol is a Mobile Industry Processor Interface (MIPI) protocol.

19. The digital-to-analog converter of claim 17, wherein the received data includes an indication of when data transmission or reception is switched between the first and second antennas, and wherein the digital-to-analog converter is configured to discard the indication and utilize the control signal to identify when data transmission or reception is switched between the first and second antennas.

20. The digital-to-analog converter of claim 17, wherein the multilevel communication protocol has a plurality of modulation levels and includes error-detection or error-correction encoding, and the binary protocol has two states and does not include the error-detection or error-correction encoding.

21. The digital-to-analog converter of claim 17, wherein the control logic is configured to:
identify, based on the control signal, whether a universal serial bus (USB) cable is connected or disconnected;
in response to identifying, based on the control signal, that the USB cable is connected, cause the determined plurality of first voltages to be output to the first antenna tuning circuit; and
in response to identifying, based on the control signal, that the USB cable is disconnected, cause the determined plurality of second voltages to be output to the first antenna tuning circuit.

* * * * *